United States Patent [19]

Papke et al.

[11] 4,173,903
[45] Nov. 13, 1979

[54] CRANK DRIVE FOR A PHOTOGRAPHIC CAMERA

[75] Inventors: Friedrich Papke; Erwin Scholz, both of Brunswick, Fed. Rep. of Germany

[73] Assignee: Rollei-Werke Franke & Heidecke, Brunswick, Fed.mRep. of Germany

[21] Appl. No.: 826,404

[22] Filed: Aug. 22, 1977

[30] Foreign Application Priority Data

Sep. 4, 1976 [DE] Fed. Rep. of Germany ....... 2639953

[51] Int. Cl.² .............................................. F16H 21/18
[52] U.S. Cl. .......................................... 74/47; 74/40; 74/48
[58] Field of Search ................. 74/48, 47, 46, 45, 526, 74/40, 51

[56] References Cited

U.S. PATENT DOCUMENTS

| 766,878 | 8/1904 | Foster | 74/48 |
| 3,029,651 | 4/1962 | Flatt | 74/48 |

*Primary Examiner*—Samuel Scott
*Assistant Examiner*—Wesley S. Ratliff, Jr.
*Attorney, Agent, or Firm*—Ernest F. Marmorek

[57] ABSTRACT

The invention relates to a crank drive, particularly to a crank drive for photographic cameras having a crank including a crankpin, and a drawbar pivotable about the crankpin. The drawbar consists of first and second rods connected to one another, and disposed in respective substantially parallel planes, which rods are joined or connected by a hinge having a hinge axis substantially parallel to the crankpin axis.

9 Claims, 7 Drawing Figures

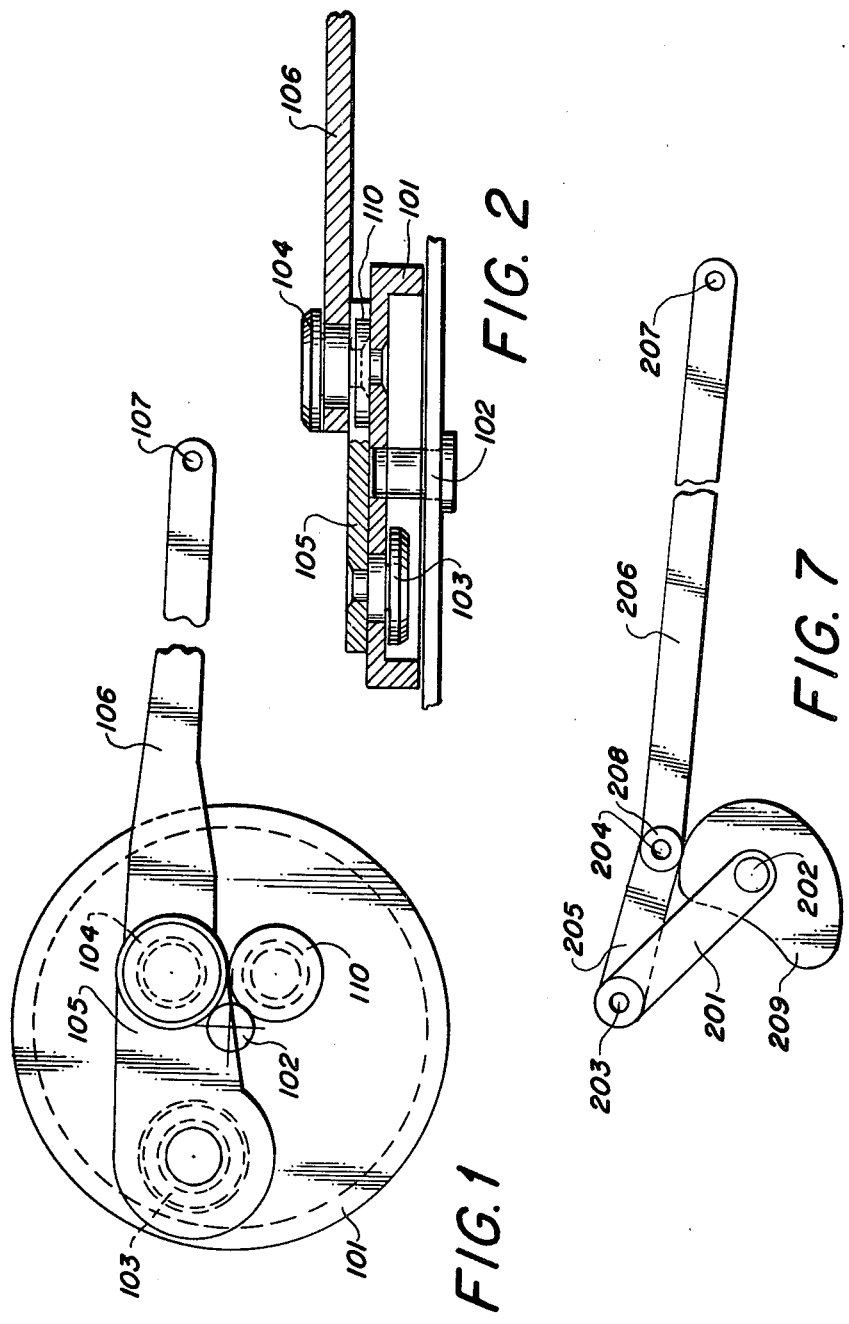

CRANK DRIVE FOR A PHOTOGRAPHIC CAMERA

BACKGROUND OF THE INVENTION

In a known crank drive of this type, which has become known from German Pat. No. DT-PS 226734, and which includes a drive for a cold saw having a saw blade moving to and fro, there is provided a pivotable lever for adjusting the stroke of the saw blade in a hinge of the drawbar, which hinge joins the two portions of the drawbar, and is also supported within the saw on a rigid support, although the support is adjustable in its position. The fulcrum of the lever is adjustable along a circular track, the hinge being located in the center point of the track when the crank drive is fully extended, and the fulcrum may be arbitrarily set. Depending upon the adjustment of the fulcrum on a predetermined portion of the circular track, the crank drive will have a different stroke, which is larger than the stroke of the crank drive, if the lever is omitted. The position or location of one end of the stroke may be changed for the different stroke motions, while the position of the other end of the stroke, which is obtained upon the crank drive being fully extended, remains unchanged. In order to obtain an effective magnification of the stroke of the crank drive, the lever must be relatively long, and may not subtend too small an angle with the drawbars in an extended position of the crank drive. But this results not only in the fulcrum of the lever being disposed considerably outside of the space required by the gear itself, but by the drawbar itself moving along a circular arc, which lies considerably outside the radius of the crank. A lever arrangement of this type therefore not only requires additional gear parts, such as both a lever and a hinge disposed in a housing in an adjustable manner, so that the parts can be preset, but it is primarily relatively bulky and requires considerable availability of space to execute the required pivotable movement of the lever, and the parts of the drawbar.

In photographic cameras, there are employed for the winding of the shutter by the filter feed, for the winding of the mirror gear, or for operatively focusing the lens, crank drives of a conventional nature, namely everywhere where a rotational movement has to be translated into a linear movement; such crank drives include a crank having a crankpin, and a draw-or pull-bar pivoted to the crankpin. These conventional crank drives permit only a stroke of the order of the crank diameter upon the crank being rotated by 180°. For a given stroke, the minimum diameter of the crank is therefore also given.

The current requirements demanded of a camera, particularly as its photographic and technical efficiency are concerned, and the additional need to construct such a camera in a compact manner, leave the designer of such a camera very little room to manipulate as far as the arrangement of mechanical construction parts is concerned, so that the required stroke frequently demands a crank diameter, which can no longer be accommodated within a volume available. In such cases the designer is forced to resort to additional transmission gears, which may, it is true, be disposed in another plane, but which after all require additional space, which may not be available, and which in any case render the drive much more expensive.

While it is possible, from a purely theoretical point of view, to transfer the principle of the aforesaid known crank drive of a saw blade and a cold saw device to the construction of a camera, such a transfer would fail because, as has already been stated earlier, the cold saw drive is not sufficiently compact, and requires a great deal of free space, which is not available in any camera.

SUMMARY OF THE INVENTION

It is therefore one of the principal objects of the present invention to devise a crank drive of the aforesaid type, where the hub or the length of a slidable track of a crank drive can be enlarged or magnified with respect to conventional crank drives having the same crank radius, without enlarging the crank radius.

This objective is attained, according to the present invention, by a crank drive which includes a housing, a crank rotatably mounted in the housing, and movable within a circle having a crank axis, and including a crankpin, a drawbar including a hinge having a hinge axis substantially parallel to the crank axis, and first and second rods pivotable in the first and second planes of motion, respectively about the hinge, the first rod being pivotable about the crankpin, the second rod being slidable along a substantially straight line defined in the housing, the planes being substantially parallel to one another, and abutment means, such as a stop disposed within the circle remaining at a predetermined distance from the crank, and projecting into the first plane of motion, so that the first rod will operatively abut against the stop when the drawbar executes a complete stroke along the straight line in a predetermined portion of the stroke, the first rod thus serving as an operative crank, and the hinge serving as an operative crankpin.

In this embodiment, the motion of the crank drive has been subdivided into two segments. In the first segment, the crank drive behaves as a conventional crank drive, and has an effective crank radius equal to the distance of the crankpin from the fulcrum of the crank, and having an effective length of the drawbar which is equal to the sum of the length of the two drawbar portions. The second motion segment is started by abutting the first portion of the drawbar, which is immediately hinged or pivoted to the crankpin to the stop, and ends when this drawbar portion is released from the stop. In the second segment, the crank drive behaves as a conventional crank drive having an effective crank radius which is equal to the distance of the hinge of the drawbar from the fulcrum of the crank, at the instant of abutment of the first drawbar portion to the stop, and having an effective length of the drawbar which is determined by the length of the second portion of the drawbar.

By these measures, it is possible to utilize the rotation of a crankpin beyond an angle of 180° up to almost 300° for a continuation of the straight line motion. This, in turn, permits an extension of the stroke of the crank drive by a factor of almost 2, while at the same time the torque required to pass through such an angle is considerably smaller compared to the torque required for a conventional crank drive. By an appropriate arrangement of the stop for the first pull-or draw-bar portion, the further advantage is obtained, that the torque required for generating an otherwise constant translation force, which in a simple crank drive falls to zero after a rotation of 180°, is reduced to zero in the gear, according to the current invention, only at the end of the increased rotation. The torque required for the increased rotation can be selected so that when, for example, a spring is stressed by the gear, where the stress required increases, as is known, with an increasing deflection of the spring, a torque which remains approximately constant must be exerted.

In a preferred implementation of the invention, the crank is formed with a disc, on which disc the stop is disposed. This permits the stop to be arranged on a first drawbar portion in a simple manner, according to the desired requirements, and at a fixed ratio with respect to the crank. If the arrangement between the stop and the crankpin is appropriately changed, then the required crank torque or stroke length of the crank drive can be varied within relatively wide regions.

In another version, according to the present invention, the stop is formed as a cylindrical cam, the first pull-or drawbar portion abutting the cam. In an alternate implementation of the present invention, the stop may also consist of a circular disc having an axis coinciding with the crankpin axis, and a roller disposed on the first drawpin portion, the disc guiding the first drawbar portion along its periphery upon the stop becoming effective. If the disc, according to another version of the invention, is formed as a cam, and if this cam is rigidly disposed on the housing, then the torque required for the increased rotation of the crank drive beyond 180° can furthermore be arbitrarily varied by sensing the cam by means of a roller disposed on the first drawbar portion.

In another version of the present invention, the hinge and the stop may be disposed with respect to one another for the hinge to be movable along a circumference of a second circle, upon the first drawbar portion operatively abutting the stop, the radius of the second circle being equal to the radius of the crankpin. This arrangement permits attainment of the maximum stroke of the crankpin drive at a given radius of the crank.

Several other versions are possible, for example, if a cam is used, the cam may be rigidly secured to the housing, and a roller may be disposed on the first rod for guiding the first rod about the cam contour, the cam contour and the roller constituting the stop. Alternately, the roller may be disposed on the hinge.

In a preferred version of the present invention, the ratio of the diameter of the second circle to the diameter of the first circle is equal to the ratio of the length of the drawbar to the length of the second drawbar portion.

BRIEF DESCRIPTION OF THE DRAWING

For a fuller understanding of the nature and objects of the invention, reference should be had to the following detailed description, taken in connection with the accompanying drawing in which:

FIG. 1 shows the crank drive, according to the present invention, with the crank being formed with a disc and a stop disposed on the disc;

FIG. 2 is a side view of the crank drive of FIG. 1;

FIG. 7 shows still another version, having a stop varying as a function of rotation of the crank.

DESCRIPTION OF THE PREFERRED EMBODIMENTS

Figure 4:
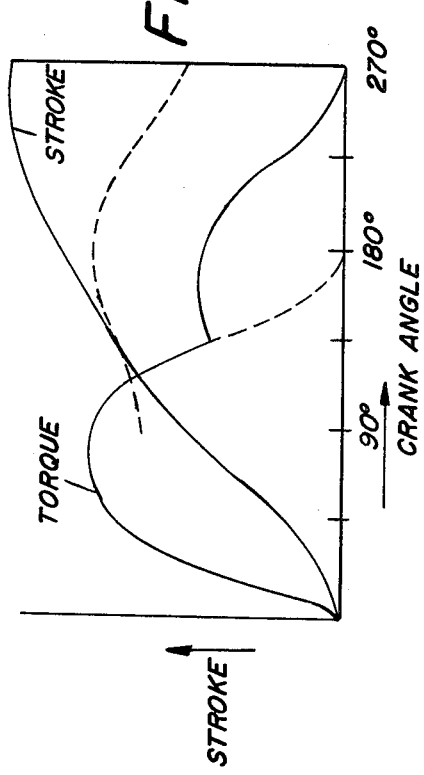
FIG. 4 shows the torque and the stroke as a function of the angle of rotation of the crank.

In carrying the invention into effect, a crank 1 which is shown in FIGS. 1 and 2 as a disc 101, is rotatable around an axis 1 or 2 disposed rigidly on the housing. A crank 103 is disposed on the disc 101, a pull-or drawbar, which will, for simplicity's sake, be referred to as a drawbar in what follows, includes a first drawbar or portion 105, which is pivoted to the crankpin 103, and a second drawbar portion or rod 106, which is formed with an opening 107, which opening is movable in a straight-line glide path. The two drawbar portions are disposed with respect to one another and with respect to the disc 101 in two substantially parallel planes, as can be best seen in FIG. 2, and are joined by a hinge 104, which has an axis substantially parallel to the axis of the crankpin 103. The end of the drawbar formed with the opening 103 is coupled to the portion of the camera to be actuated, for example, to the cocking lever of the camera. On the disc 101, there is disposed a cylindrical cam 110, which has a height so that the first drawbar portion or rod 105 can abut thereon, while the second drawbar portion, or rod 106 passes past the cam 110.

Figure 3:
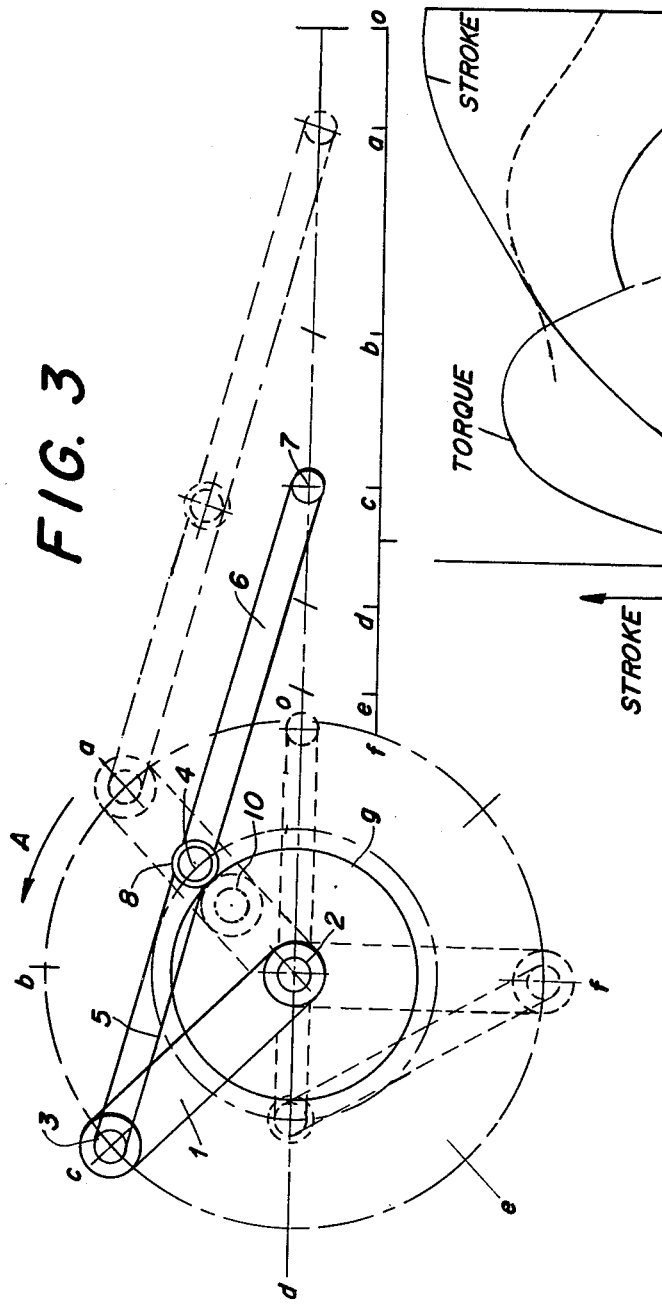
FIG. 3 is a version of the present invention wherein the effective radius of the crank, and the effective length of the drawbar have a constant ratio.

The operation of the crank drive is best illustrated by means of the examples shown in FIGS. 3 to 6, which constitute two special cases of several possible versions of the crank drive, according to the present invention. The same construction elements carry the same numerals, except that a "10" or "100" has been added to the numerals to differentiate the various versions. In FIG. 3, the crank 1 is rotatable around the axis 2, the latter being rigid with the housing. The drawbar is pivotable on the crankpin 3, and includes rods or portions 5 and 6 joined by a hinge 4. An opening 7 disposed on an end of the drawbar remote from the crankpin 3 is movable along a straight line path, and is coupled with the camera part to be actuated. A roller 8 is additionally disposed on the hinge 4.

A disc 9, having the same axis as the crank shaft 2, may be rigid with the housing, or rotatable along with the crank 1. If the crank 1 is rotated in the direction of the arrow "A", then after a rotation of about 135°, the roller 8 abuts against the disc 9 at a point c. If the crank 1 is rotated further, then the drawbar portion 5 remains in its relative position with respect to the crank 1, and the hinge 4 is effective therefrom as a crankpin, the crank radius being determined by the diameter of the disc 9. Only if the crank 1 has reached, in the example shown, a rotation of about 270° (point f) then the effective crankpin 8 is disposed at the bottom dead center, so that the maximum stroke of the end of the drawbar formed with an opening 7 is being reached. In the examples shown, the diameter of the disc 9, and the length of the drawbar portion 6, as well as the diameter of the crankpin 3, and the total length of the drawbar, consisting of rods 5 and 6, has been selected, so that the ratio of the effective crankpin radius to the effective length of the drawbar is equal in both cases ($S = e/r = $ V constant, where S is the ratio of the effective crankpin radius to the effective drawbar length, e is effective radius of the crankpin, and r is the effective length of the drawbar).

FIG. 4 shows the stroke, namely the path of the pull-or drawbar formed with an opening 7, as well as the torque to be exerted on the crankpin in dependence of the angular displacement of the crank 1. In the crank position c, corresponding to a rotation of 135° from the initial position, there occurs a transfer from the crankpin 3 to the now effective crankpin 4. As can be seen, this transfer is accomplished to a large extent continuously, so that no detent is formed in the curve depicting the stroke as a function of the angular position of the crank. The curve showing torque as a function of the angular position of the crank is, however, formed with a detent, which is due to a change in the transmission ratio. The curve showing the torque has been ascertained from the force required to act during the complete stroke on an end of the drawbar formed with an opening 7, as seen by the crank. This curve corresponds to the actual conditions if the spring is stressed, since the counter-action of the spring increases with an increasing stroke, so that the torque exerted on the crank remains largely constant over the whole region.

Figure 5:
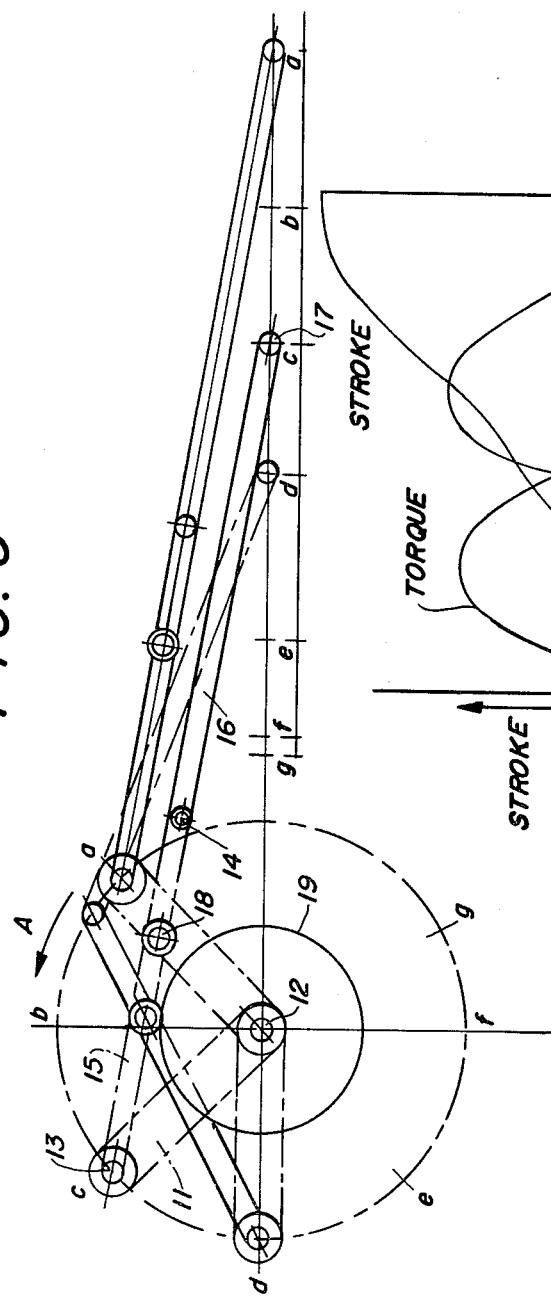
FIG. 5 shows an alternate version having a crank radius effectively remaining constant upon reaching a predetermined angle.
Figure 6:
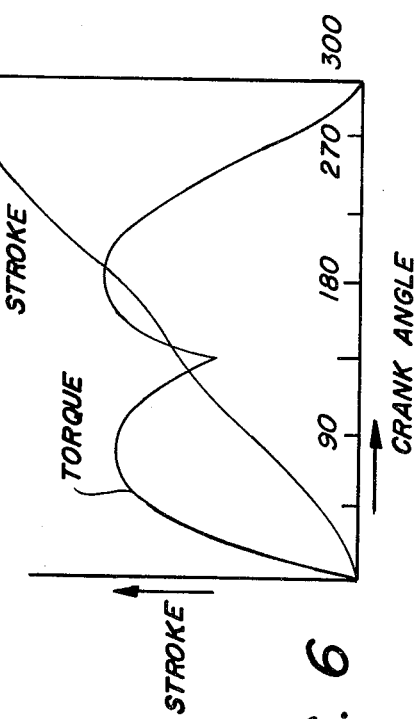
FIG. 6 shows the relationship of the torque stroke as the function of the angle of displacement of the crank of the version shown in FIG. 5.

FIGS. 5 and 6 refer to a second implementation of the present invention. In this latter implementation, the hinge 14 and the roller 18 do not coincide. Their position on the drawbar portion 15 is selected, so that the roller 18 abuts a disc 19, if the crank is in a position d, namely has been rotated by 180°. In this latter position, the hinge 14 is positioned exactly on the circumferential circle of the crank, and retains this position even when the crank is rotated further into positions e and f, up to the position g. If the crank 11 has reached the position g, then the hinge 14 has reached the point d, namely, the lower dead center of the gear. In this implementation, the radius of the crank does not change. The increase in hub length in this case is identical with the length of the pull-or drawbar 15 from the pin 13 to the hinge 14.

As can be seen from FIG. 6, upon the transfer of the pin 13 to the hinge 14, as an effective crankpin, a minor unnevenness occurs in the stroke. The torque curve shows at this transfer point a minimum, approximately equal halves of the torque curve being disposed on respective opposite portions of a transfer point.

In the implementation examples of FIGS. 3 and 5, a circular disc 9 has been used as a stop for the roller 8. If a cam 209 (best seen in FIG. 7) is substituted for the circular disc 9, and is disposed rigidly on the housing, it is possible to change the effective crank radius of the roller 208 during its operation, and therefore to influence the shape of the stroke curve in the second part of the crank rotation (in FIG. 6 and in FIG. 4, the upper portion to the right). If, however, this stop is rigid with the crank 1, then a cam shaft 10 disposed on the crank 1 is sufficient, just as, or similar to the arrangement shown in FIG. 1 (see dotted lines in FIG. 3). If a spring or the like is to be wound, then the hinge 4 may be made to turn freely in both directions. If the gear is required, however, to both pull and push the drawbar, the latter consisting of rods 5 and 6, then the hinge 4 must be formed with a stop to prevent deflection of the rods 5 and 6 in an outward direction.

Having thus described the invention, what we claim as new and desire to be secured by Letters Patent, is as follows:

1. A crank drive, particularly for a photographic camera, comprising, in combination:
 a housing,
 a crank, rotatably mounted on said housing and being movable within a circle, having a crank axis and including a crankpin,
 a drawbar including a hinge having a hinge axis substantially parallel to the crank axis, and first and second rods pivotable in first and second planes of motion, respectively, about said hinge, an end of said first rod being pivotable about said crankpin, said second rod being slidable along a substantially straight line defined in said housing, said planes being substantially parallel to one another, and
 abutment means disposed within said circle, remaining at a predetermined distance from said crankpin, and projecting into said first plane of motion, whereby said first rod will operatively abut against said abutment means when the drawbar executes a complete stroke along said straight line during a predetermined portion of said stroke, so that said first rod serves as an operative crank, and said hinge serves as an operative crankpin.

2. A crank drive according to claim 1, wherein said abutment means is disposed on said crank.

3. A crank drive according to claim 2, wherein said crank is a disc.

4. A crank drive according to claim 2, wherein said abutment means is a cylindrical cam.

5. A crank drive according to claim 1, further comprising a disc having an axis coinciding with said crank axis, and a roller disposed on said first rod for guiding said first rod about the periphery of said disc, the disc periphery and said roller constituting said abutment means.

6. A crank drive according to claim 1, further comprising a cam rigidly secured to said housing, having a predetermined contour, and a roller disposed on said first rod for guiding said first rod about the cam contour, the cam periphery and said roller constituting said abutment means.

7. A crank drive according to claim 5, wherein said roller is disposed on said hinge.

8. A crank drive according to claim 1, wherein said hinge and said abutment means are so disposed with respect to one another that upon said first rod abutting said abutment means the drawbar is bent about the hinge, whereby said hinge becomes movable along the circumference of a second circle.

9. A crank drive according to claim 8, wherein the ratio of the diameter of said second circle to the diameter of the first circle is equal to the ratio of the length of said drawbar to the length of said second rod.

* * * * *